(12) United States Patent
Wolfsdorf

(10) Patent No.: US 6,312,025 B1
(45) Date of Patent: Nov. 6, 2001

(54) PIPE COUPLING

(75) Inventor: Klaus D. Wolfsdorf, Denkingen (DE)

(73) Assignee: Sikla GmbH & Co. KG (DE)

( * ) Notice: Subject to any disclaimer, the term of this patent is extended or adjusted under 35 U.S.C. 154(b) by 0 days.

(21) Appl. No.: 09/560,765

(22) Filed: Apr. 28, 2000

(30) Foreign Application Priority Data

Apr. 30, 1999 (DE) .............................. 199 19 728

(51) Int. Cl.⁷ .............................. F16L 19/00; F16L 17/00
(52) U.S. Cl. ...................... 285/369; 285/104; 285/105; 285/420; 411/544
(58) Field of Search .................................. 285/369, 335, 285/370, 397, 318, 104, 105, 420, 373, 236, 110; 411/544

(56) References Cited

U.S. PATENT DOCUMENTS

| | | | |
|---|---|---|---|
| 1,143,321 | * 6/1915 | Robinson | 285/264 |
| 2,921,801 | * 1/1960 | Beyer | 285/5 |
| 3,877,733 | * 4/1975 | Straub | 285/105 |
| 4,616,858 | * 10/1986 | Sauer | 285/235 |
| 4,726,611 | * 2/1988 | Sauer | 285/110 |
| 5,248,169 | * 9/1993 | Barbe et al. | 285/110 |

* cited by examiner

*Primary Examiner*—B. Dayoan
*Assistant Examiner*—Carlos Lugo
(74) *Attorney, Agent, or Firm*—Patterson, Thumate, Skaar & Christensen, P.A.

(57) ABSTRACT

The invention relates to a pipe coupling having a sleeve-shaped outer body for accommodating a sealing arrangement and at least one pair of clamping elements, which is arranged adjacent to one side of the sealing arrangement inside the sleeve-shaped outer body and serves to clamp the end of an inserted pipe in place, in which case the pair of clamping elements can be restrained against the end of an inserted pipe transversely to the axis of the pipe coupling via a clamping screw passed through the sleeve-shaped outer body and is pressed apart by of a spring, and the clamping elements are guided in the restraining direction in the sleeve-shaped outer body.

15 Claims, 4 Drawing Sheets

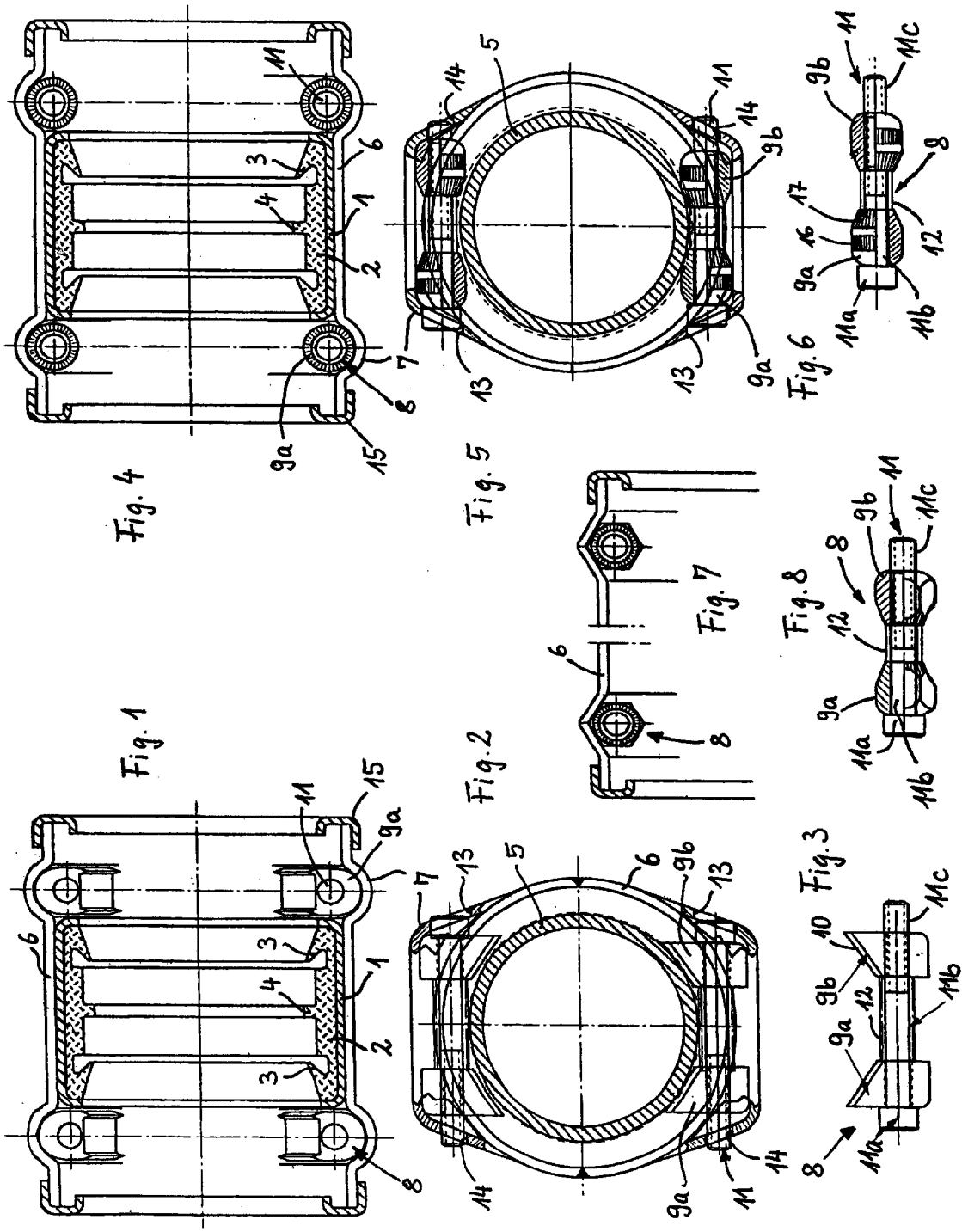

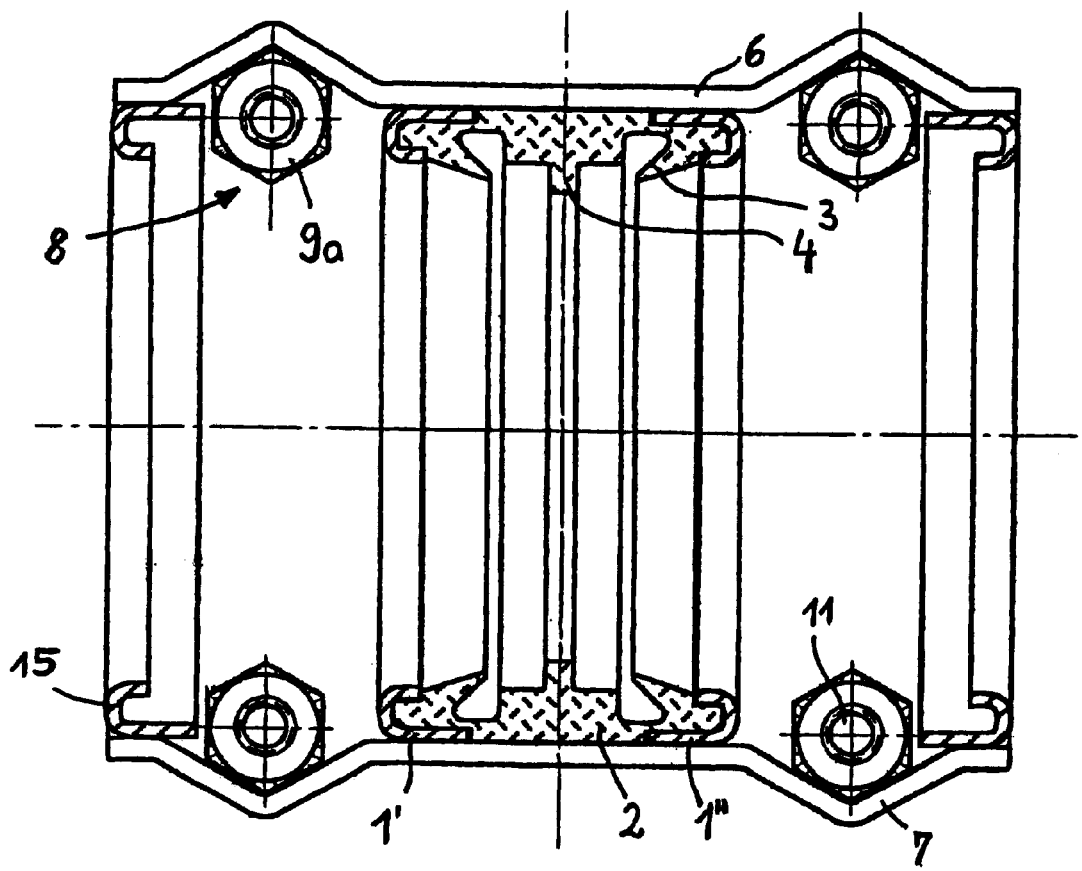

PIPE COUPLING

TECHNICAL FIELD

The invention relates to a pipe coupling as can be used for the tight connection of two pipe ends of an, in particular metallic, pipeline.

BACKGROUND OF THE INVENTION

German Patent DE 197 19 066 C1 discloses a pipe coupling which comprises a sealing sleeve which accommodates a seal and is arranged inside a supporting body, the supporting body, at least adjacent to one side of the sealing sleeve, supporting locking elements for one end of an inserted pipe, and these locking elements can dig into the inserted pipe while being raised in the radial direction when extension stress occurs. The locking elements are rectangular clamping plates, which are supported on the supporting body and are preloaded in the extension direction of the pipe via springs supported on the supporting body. Here, the clamping plates are accommodated by the supporting body in such a way that they can be pushed out, the supporting body being formed in its center part from axially extending lugs. This construction is relatively complicated with regard to the number of components and the preassembly as well as the final assembly when coupling pipes.

Furthermore, German Patent DE 44 28 570 C1 discloses a pipe coupling in which a relatively complicated connecting socket is provided, which is to be made as a cast part, has inner grooves, requiring internal machining, for accommodating sealing collars and is provided with through holes transversely to the longitudinal axis, the through holes serving to accommodate clamping units. The latter may consist of a clamping screw and two locking elements which can be adjusted with the clamping screw and are in the form of clamping wedges or sleeves which have cutting ribs and can be restrained against the pushed-in pipe via the clamping screw. However, the clamping units, if they were to be preassembled, would be displaceable in the through holes and could then hinder the insertion of the pipe. In this respect, this pipe coupling is also complicated and difficult to assemble.

SUMMARY OF THE INVENTION

An object of the invention is to provide a pipe coupling which can be produced in a preassembled state with little outlay. A further object of the invention is to provide a pipe coupling which is easy to assemble.

The subject matter of the invention is therefore a pipe coupling having a sleeve-shaped outer body for accommodating a sealing arrangement and at least one pair of clamping elements, which is arranged adjacent to one side of the sealing arrangement inside the sleeve-shaped outer body and serves to clamp the end of an inserted pipe in place, in which case the pair of clamping elements can be restrained against the end of an inserted pipe transversely to the axis of the pipe coupling via a clamping screw passed through the sleeve-shaped outer body and is pressed apart by means of a spring, and the clamping elements are guided in the restraining direction in the sleeve-shaped outer body.

Owing to the fact that a sealing sleeve containing a seal is accommodated in the preassembled state as an appropriate construction unit by a sleeve-shaped outer body, an independent, pressure-absorbing sealing unit facilitating the preassembly is formed. Owing to the fact that at least one pair of locking elements pressed apart by a spring and in the form of clamping elements is accommodated on the inside by the sleeve-shaped outer body, and this pair of locking elements can be restrained against the inserted pipe end transversely to the axis of the pressure coupling via a clamping screw passed through the outer body, the locking elements being guided in the restraining direction in the outer body, the entire pipe coupling can be preassembled from relatively few parts, in which case the locking elements also does not impair the actual assembly on account of the spring located in between, since the pipes to be connected can be pushed from here unhindered into the pipe coupling, since the pairs of locking elements are arranged so as to be self-centering by the spring relative to the pipe. In addition, during the coupling, the locking elements are pressed outward against the outer sleeve by the respective pipe end and are thereby additionally clamped, this action being intensified by internal pressurizing of the pipes.

Further objects, advantages and embodiments of the invention will become apparent from the following detailed description and accompanying drawings.

The invention will now be described by way of example with respect to preferred embodiments as shown in the drawings.

BRIEF DESCRIPTION OF THE DRAWINGS

FIG. 1 shows an exemplary embodiment of a pipe coupling in axial section.

FIG. 2 shows an end side of the pipe coupling of FIG. 1 in partial section.

FIG. 3 shows an embodiment of a clamping unit as provided in the case of the pipe coupling of FIG. 1.

FIG. 4 shows a further embodiment of a pipe coupling in axial section.

FIG. 5 shows the pipe coupling of FIG. 4 in a view corresponding to FIG. 2.

FIG. 6 shows a further embodiment of a clamping unit as provided in the case of the pipe coupling of FIG. 4.

FIG. 7 shows a detail of an additional embodiment of a pipe coupling in axial section.

FIG. 8 shows an embodiment of a clamping unit as provided in the case of the pipe coupling of FIG. 7.

FIG. 9 shows a further exemplary embodiment of a pipe coupling in axial section.

DESCRIPTION OF PREFERRED EMBODIMENTS

Figure 10:
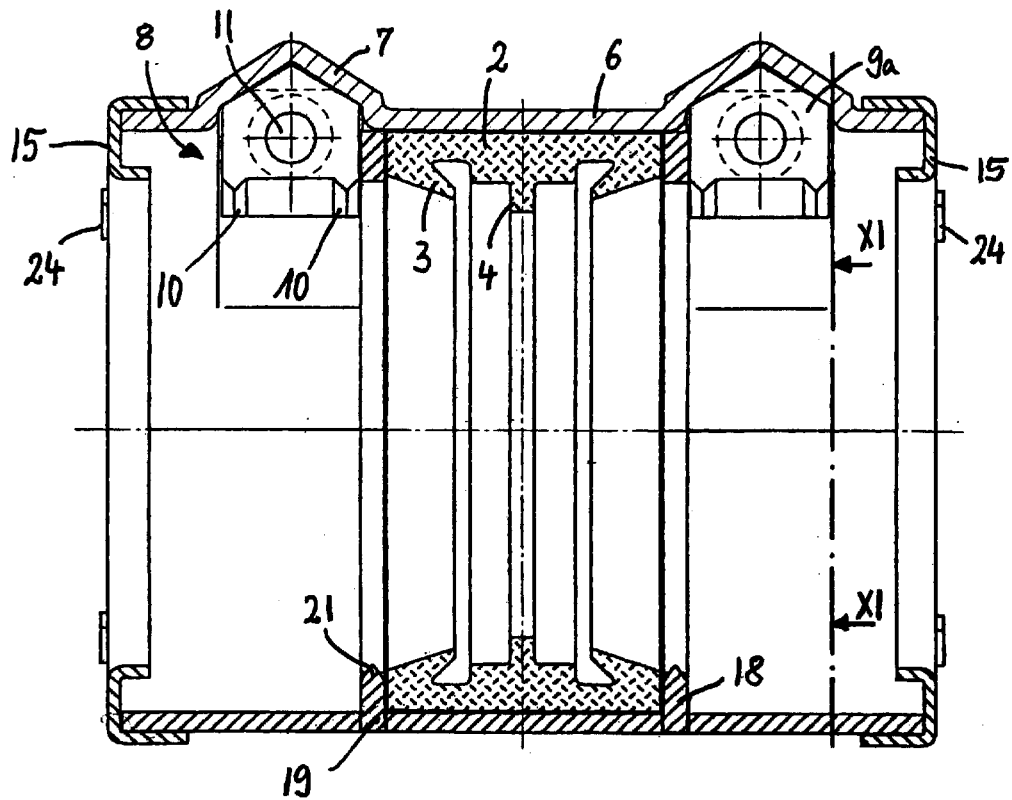
FIG. 10 shows an additional embodiment of a pipe coupling in section.

The pipe coupling shown in FIGS. 1 and 2 comprises a sealing sleeve 1, which is closed on the outside and the interior of which forms a sealing chamber, which accommodates a sealing collar 2 formed as a lip sealing ring. The latter has in each case a sealing lip 3 on both sides at the inner circumference and a central stop ring 4 which extends radially inwards, is surrounded by supporting shoulders and is intended for two ends, to be accommodated by the pipe coupling, of pipes 5 to be connected, the inside diameter of the stop ring 4 being greater than or equal to that of the pipes 5.

The sealing sleeve 1 carrying the sealing collar 2 is inserted axially under prestress into a central position in a sleeve-shaped outer body 6 serving as housing and is thus held in the latter.

The outer body 6 is a relatively thin-walled sheet-metal formed part which may be formed from two half shells, for example welded to one another. On both sides in the exemplary embodiment, the outer body 6, adjacent to the sealing sleeve 1, has in each case two opposite bulges 7, which are parallel to one another and the inner surfaces of which in each case form a guide for a clamping unit 8.

Each clamping unit 8 comprises two clamping elements 9a, 9b, which in the embodiment according to FIGS. 1 to 3 are designed as clamping wedges having cutting ribs 10 facing the circumference of the pipe 5 to be clamped in place and arranged essentially tangentially thereto. The two clamping elements 9a, 9b are arranged on a clamping screw 11, one clamping element 9a being adjacent to the head 11a of the clamping screw 11 on a thread-free section 11b of the clamping screw 11, whereas the other clamping element 9b is screwed onto the threaded end section 11c of the clamping screw 11. Located between the two clamping elements 9a, 9b is a helical spring 12 (schematically indicated), which presses the clamping element 9a against the head 11a of the clamping screw 11.

In the side region of the bulges 7, the outer body 6 is provided with a passage opening 13 on one side for the head 11a of the clamping screw 11 and with a passage opening 14 on the opposite side for the threaded end section 11c of the clamping screw 11, the passage openings 13, 14 having a diameter with appropriate clearance for the head 11a or the threaded section 11c respectively.

The pipe coupling may accordingly be preassembled as an entity.

The preassembled clamping unit 8 is centered and held in the outer body 6 as a result of the clamping elements 9a, 9b preloaded relative to one another by a spring, the clamping screw 11 projecting slightly from the outer body 6 on both sides.

If a pipe 5 is pushed in, this pipe 5 is clamped in place by the clamping unit 8 by turning the clamping screw 11, the clamping unit 8 being automatically centered relative to the pipe 5. The length of the clamping screw 11 is expediently dimensioned in such a way that its head 11a is accommodated by the outer body 6 when the pipe 5 is clamped in place, as a result of which visual monitoring of the assembly is made possible at the same time.

The clamping units 8, if need be, may be additionally supported on the lateral shoulders of the sealing sleeve 1.

The outer body 6, adjacent to the clamping unit 8, may in each case expediently carry a guide ring 15 at the end faces for the pipe to be inserted, which guide ring 15, in this exemplary embodiment, encloses the outer body 6 and can thus counteract buckling of the outer body 6 when the pipe 5 is clamped in place.

In the embodiment of FIGS. 4 to 6, the clamping elements 9a, 9b may also be designed as clamping sleeves, which have a conical engagement surface 16, expediently knurled or provided with cutting ribs, for engaging with the outside of the pipe 5 to be clamped in place and if need be also a knurled engagement surface 17, extending in the circumferential direction, for engaging with the outer body 6 in order to secure the clamping elements 9a, 9b against rotation when turning the clamping screw 11.

For this purpose, in the embodiment shown in FIGS. 7 and 8, the outer circumference of the clamping elements 9a, 9b designed as clamping sleeves is polygonal (here hexagonal) and is in engagement with the correspondingly shaped bulge 7.

In the embodiment shown in FIG. 9, the sealing collar 2, instead of its arrangement in a sealing sleeve 1 according to FIG. 1, is mounted on both sides in each case by a supporting ring 1', 1" which is essentially J-shaped in section. This is a very cost-effective solution, although it requires a sufficiently rigid outer body 6.

In addition, the guide rings 15 in this case, which in operation at the same time constitute supporting bearings, are clamped in place in the outer body 6, which guide rings, on account of their rigidity, need not be secured against expanding.

Figure 11:
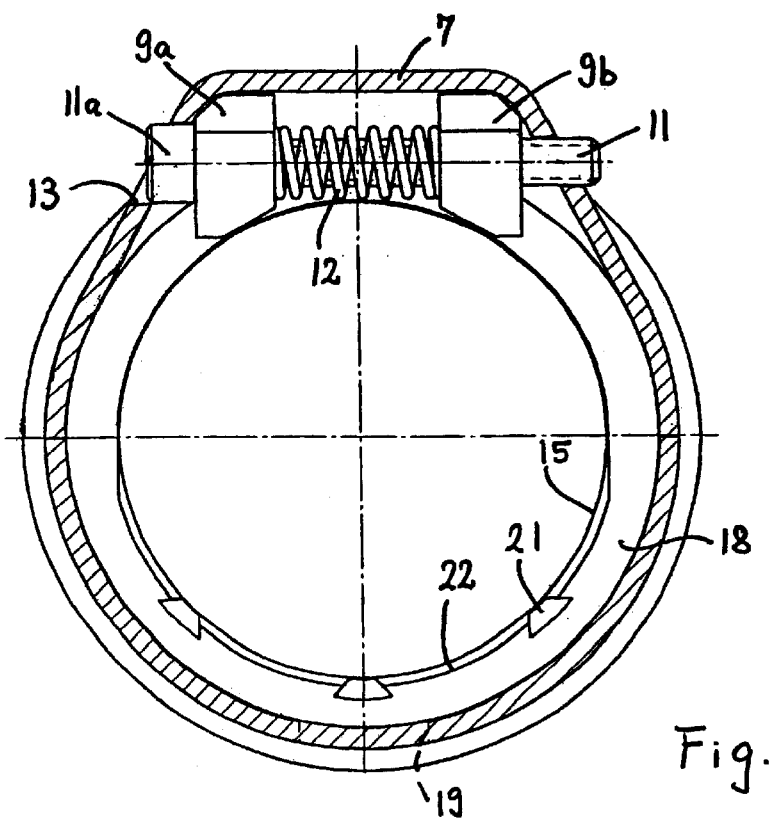
FIG. 11 shows a section along line XI—XI of FIG. 10 without inserted sealing collar.
Figure 12:
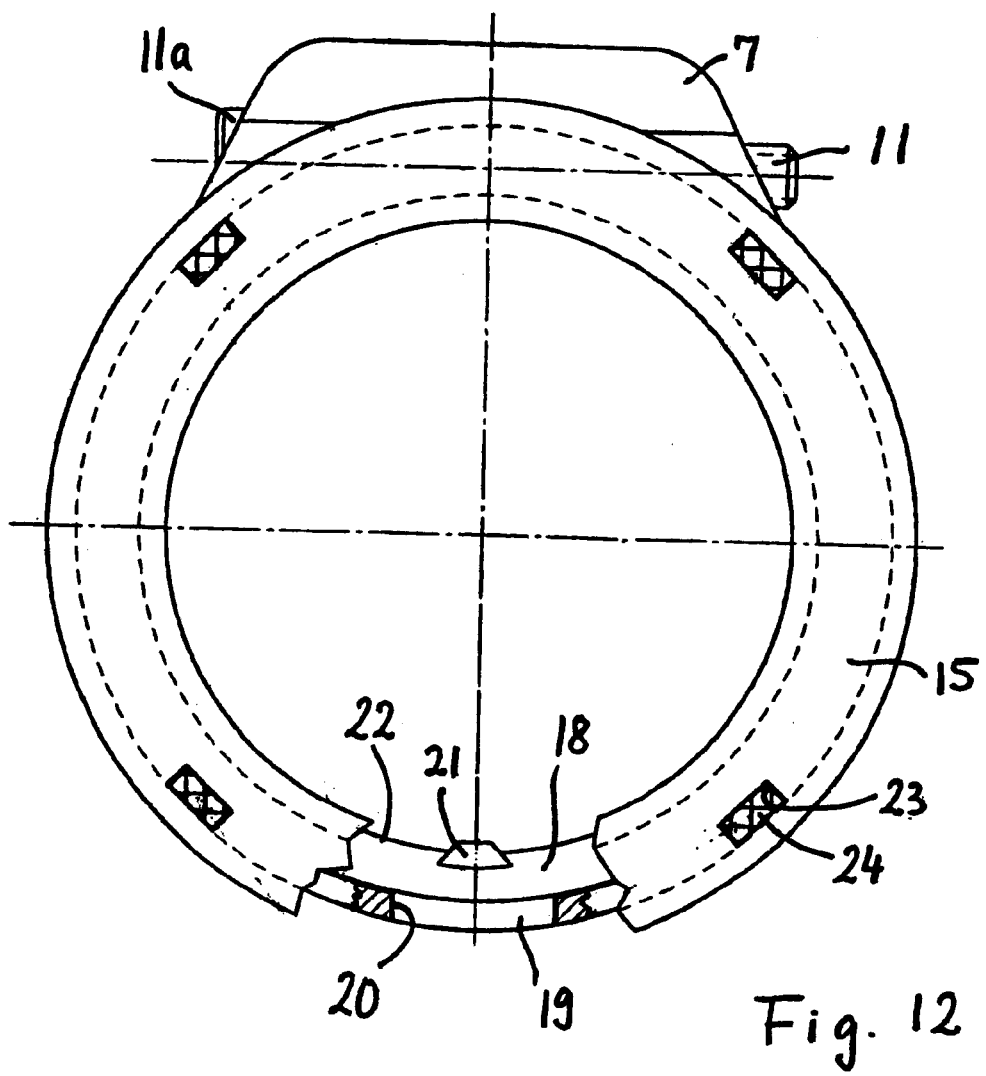
FIG. 12 shows an end view of the pipe coupling of FIG. 10 in partial section.

In the embodiment shown in FIGS. 10 to 12, in addition to a pair of clamping elements 9a, 9b, in each case a wedge ring 18 is provided for a respective end of an inserted pipe 5. The two wedge rings 18 are arranged adjacent to the sealing collar 2, so that the latter is framed by the wedge rings 18 and the outer sleeve 6.

The wedge rings 18 have an extension 19, with which they are inserted in a rotationally locked manner into a corresponding opening 20, opposite the respective clamping unit 8, in the outer sleeve 6, and they are supported on the opposite side on the outside by the adjacent wall of the clamping elements 9a, 9b.

In a region 22 of enlarged inside diameter opposite the clamping unit 8, the wedge rings 18 have one or more wedges 21 (three in the exemplary embodiment shown), which are at a distance from one another, are arranged on the inside of the wedge rings 18 and are formed in one piece with the wedge rings, the cutting edges of the wedges 21 lying virtually on the inside diameter of the wedge rings 18. When the clamping units 8 are tightened, they also at the same time press the respective end of an inserted pipe 5 against the wedges 21.

In this exemplary embodiment, the guide rings 15 are provided with passage openings 23 for corresponding axial webs 24 of the outer sleeve 6, the webs 24 being caulked after the assembly.

Although the invention has been described in some detail by way of illustration and example, for purposes of clarity and understanding, it will be obvious that certain changes and modifications may be practiced within the scope of the invention.

What it claimed is:

1. A pipe coupling having a sleeve-shaped outer body for accommodating a sealing arrangement and at least one pair of clamping elements, which is arranged adjacent to one side of the sealing arrangement inside the sleeve-shaped outer body and serves to clamp the end of an inserted pipe in place, in which case the pair of clamping elements can be restrained against the end of an inserted pipe transversely to the axis of the pipe coupling via a clamping screw passed through the sleeve-shaped outer body and is pressed apart by means of a spring, and the clamping elements are guided in the restraining direction in the sleeve-shaped outer body.

2. The pipe coupling as claimed in claim 1, the clamping elements being clamping wedges.

3. The pipe coupling as claimed in claim 1, the clamping elements, on the side facing the end of the pipe, having at least one cutting rib for digging into the pipe.

4. The pipe coupling as claimed in claim 1, the clamping elements being clamping sleeves.

5. The pipe coupling as claimed in claim 4, the clamping sleeves having knurled engagement surfaces.

6. The pipe coupling as claimed in claim 1, the clamping elements having a polygonal cross section, the sleeve-shaped outer body having guide surfaces corresponding thereto.

7. The pipe coupling as claimed in claim 1, the sleeve-shaped outer body having a passage opening on one side for the head of the respective clamping screw and a passage opening on the other side for the threaded shank of the clamping screw, in each case of appropriate diameter.

8. The pipe coupling as claimed in claim 1, the length of the clamping screw being such that its head, in the clamped state of the pipe, is essentially accommodated by the sleeve-shaped outer body.

9. The pipe coupling as claimed in claim 1, the sleeve-shaped outer body, adjacent to the at least one pair of clamping elements, carrying a guide ring at the end faces, the guide ring having a supporting effect.

10. The pipe coupling as claimed in claim 9, the guide ring enclosing the sleeve-shaped outer body on the outside.

11. The pipe coupling as claimed in claim 1, the sleeve-shaped outer body being a sheet-metal formed part.

12. The pipe coupling as claimed in claim 1, the sealing arrangement comprising a sealing collar which is mounted laterally by supporting rings or is arranged in a sealing sleeve.

13. The pipe coupling as claimed in claim 1, the sealing arrangement comprising a sealing collar which is mounted laterally by wedge rings.

14. The pipe coupling as claimed in claim 13, the wedge rings in each case having an extension accommodated by an opening in the outer sleeve and being supported on the outside by adjacent clamping elements.

15. The pipe coupling as claimed in claim 13, the wedge rings in each case having at least one wedge formed in one piece with the wedge ring and projecting inward.

* * * * *